(12) United States Patent
Aota et al.

(10) Patent No.: US 7,787,721 B2
(45) Date of Patent: Aug. 31, 2010

(54) MIRROR, MIRROR UNIT, AND OPTICAL SWITCH

(75) Inventors: Hirofumi Aota, Yokohama (JP); Tamotsu Akashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1065 days.

(21) Appl. No.: 11/044,179

(22) Filed: Jan. 28, 2005

(65) Prior Publication Data
US 2006/0093257 A1    May 4, 2006

(30) Foreign Application Priority Data
Oct. 29, 2004    (JP) ............... 2004-317389

(51) Int. Cl.
*G02B 6/26*    (2006.01)
(52) U.S. Cl. .......................... 385/18; 385/16
(58) Field of Classification Search ............... None
See application file for complete search history.

(56) References Cited

U.S. PATENT DOCUMENTS

| 4,154,507 | A | * | 5/1979 | Barr .................. 359/220.1 |
| 5,222,112 | A | | 6/1993 | Terasawa et al. |
| 5,377,004 | A | * | 12/1994 | Owen et al. ............ 356/301 |
| 5,481,393 | A | | 1/1996 | Kashima et al. |
| 5,625,447 | A | * | 4/1997 | Kikuchi et al. ......... 356/4.01 |
| 5,859,424 | A | | 1/1999 | Norton et al. |
| 6,263,127 | B1 | | 7/2001 | Dragone et al. |
| 2003/0039089 | A1 | | 2/2003 | Lee et al. |
| 2003/0138213 | A1 | * | 7/2003 | Jin et al. .................. 385/47 |
| 2003/0184888 | A1 | | 10/2003 | Hosonuma |
| 2004/0105616 | A1 | * | 6/2004 | Kazama et al. ........... 385/18 |

FOREIGN PATENT DOCUMENTS

| GB | 2279763 | 1/1995 |
| JP | 11-264952 | 9/1999 |
| JP | 2000-347065 | 12/2000 |
| JP | 2003-515187 | 4/2003 |
| JP | 2004-506230 | 2/2004 |
| WO | 01/37021 | 5/2001 |
| WO | WO 01/37021 | 5/2001 |
| WO | WO 02/12925 A2 | 2/2002 |
| WO | WO 02/12925 A3 | 2/2002 |
| WO | 03/023489 A1 | 3/2003 |

OTHER PUBLICATIONS

European Search Report issued Nov. 4, 2005 for European Patent Application No. 05001593.2.
Chinese Office Action issued on Mar. 23, 2007 with respect to the corresponding Chinese Patent Application No. 200510007471.6.
Japanese Office Action mailed on Apr. 6, 2010 in corresponding Japanese Patent Application 2004-317389.

* cited by examiner

*Primary Examiner*—Charlie Peng
*Assistant Examiner*—Eric Wong
(74) *Attorney, Agent, or Firm*—Staas & Halsey LLP

(57) ABSTRACT

The MEMS mirror, which has a reflective surface whose angle is variably changed, is provided with a portion whose reflectance is lowered than that of a center portion. The portion is provided in at least part of ends on a predetermined side of the MEMS mirror. As a result, a diffraction influence of light reflected by the end surfaces can be reduced at the time of angle change of the MEMS mirror.

10 Claims, 14 Drawing Sheets

(WHEN W2=T × 1/18)

WAVELENGTH DISPERSION DIRECTION

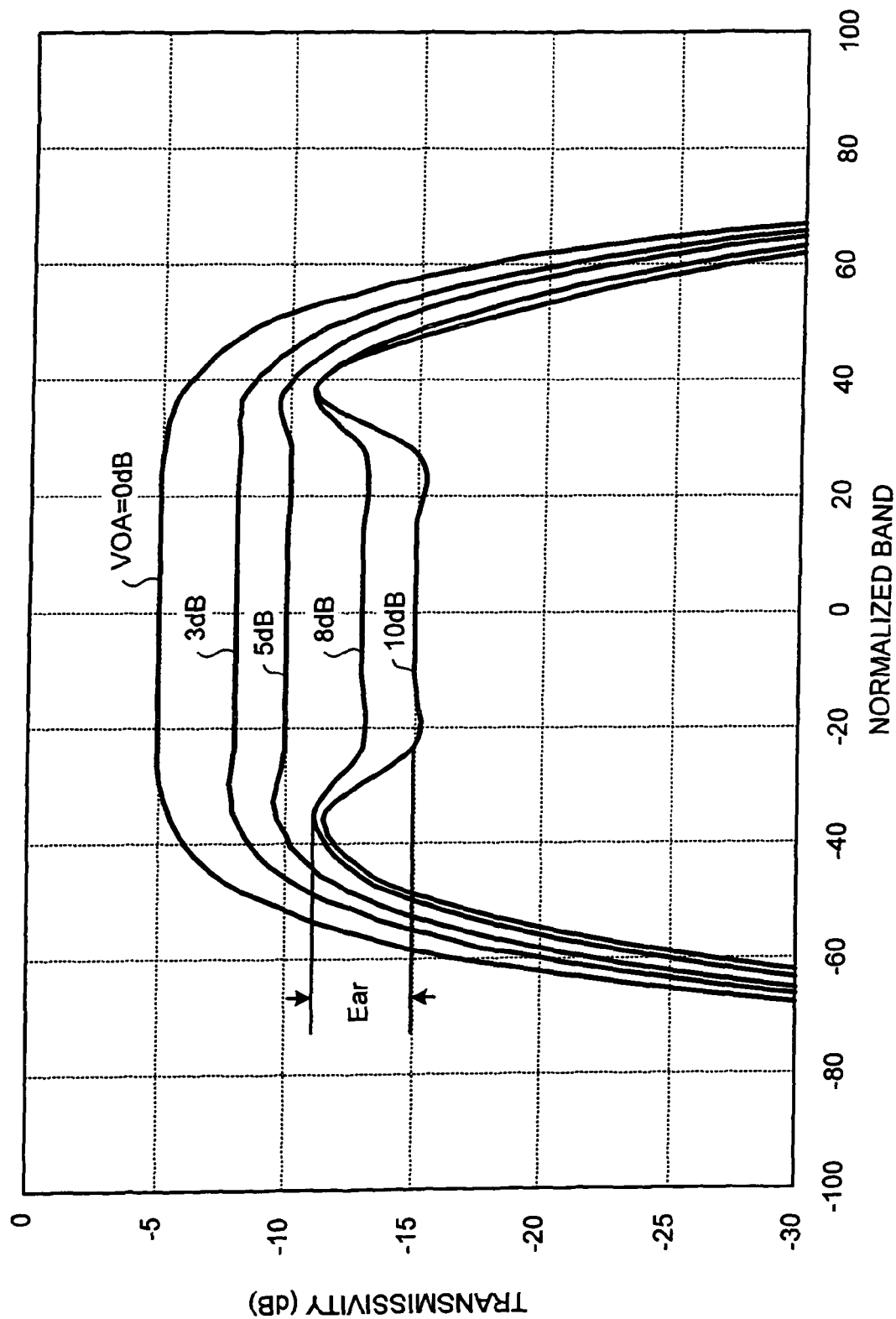

MIRROR, MIRROR UNIT, AND OPTICAL SWITCH

CROSS-REFERENCE TO RELATED APPLICATIONS

This application is based upon and claims the benefit of priority from the prior Japanese Patent Application No.2004-317389, filed on Oct. 29, 2004, the entire contents of which are incorporated herein by reference.

BACKGROUND OF THE INVENTION

1) Field of the Invention

This invention relates to a mirror that is provided in an optical switch and can reduce the diffraction influence of light reflected by the edges of its reflective surface.

2) Description of the Related Art

Conventionally, channel switching in an optical transmission system is carried out by an electrical switch after conversion of optical signals into electrical signals. However, it is possible to enhance a speed of the channel switching and its efficiency by using a switch (optical switch) that switches channels as optical signals without converting them into electrical signals.

FIG. 8A is a perspective view to represent a structure of an optical switch. FIG. 8B is a side view to represent the optical switch. An optical switch 10 is constructed from a spectral element 1 to separate wavelength-multiplexed light signals into their spectral components, an input/output optical system 2 (input optical system and output optical system) having an input port, output ports, and a collimator lens array that are arranged in an array form, and the like, a condensing optical system 3, and a movable reflector 70 provided with micro electro mechanical system (MEMS) mirrors 4 corresponding to a plurality of wavelengths that have been separated into spectral components, respectively.

The spectral element 1 shown in FIG. 8A is an example that uses transmission-type diffraction grating. This spectral element 1 is input with a wavelength multiplexed optical signals from the input port and disperses and outputs wavelength components contained in this wavelength multiplexed optical signals in different directions (horizontal direction in the drawing) for every wavelength. The movable reflector 70 is provided with a plurality of micromirrors (MEMS mirrors 4) arranged in an array form in the spectral direction (dispersion) of wavelengths by the spectral element (diffraction grafting). Among optical signals that have been separated by the spectral element 1, each MEMS mirror 4 reflects an incident optical signal to the MEMS mirror itself depending on its arrangement position, and has a function of a wavelength selection switch that leads the reflected optical signals to any one of the plural output ports in the input/output optical system 2.

Selection of output port can be carried out by changing angles of the reflective surface of each MEMS mirror 4, and independently different switching is possible with respect to a plurality of wavelengths by independently carrying out angle control of the reflective surface of each MEMS mirror 4.

For example, as shown by the dotted line in FIG. 8B, an angle of the reflective surface of one MEMS mirror 4 that constitutes the movable reflector 70 is allowed to change so as to lead reflected light to a different output port (for example, the angle is changed along the arrangement direction of the ports). Thus, it is possible to distribute a specific wavelength contained in the wavelength multiplexed optical signals input from the input port to any one of the output ports (for example, refer to Published Japanese Translations of PCT International Publication for Patent Applications No. 2003-515187).

Further, intensity of optical signals input to output ports can be attenuated not by a dynamic motion of selection of an output port but by changing slightly the angle of each MEMS mirror 4 of the movable reflector 70.

FIG. 8C is a schematic for explaining a principle of output light attenuation. An angle change of output light by changing an angle of the MEMS mirror 4 of the movable reflector 70 is converted to translation change by the spectral element 1. As shown by the solid line in FIG. 8C, when an output light beam (beam having a center wavelength) is coupled in a state where the output light beam does not deviate from the axis of the collimator lens in the input/output optical system 2, it is in a state where transmissivity is the least. However, when the angle of the reflective surface of the MEMS mirror 4 of the movable reflector 70 is slightly changed (the reflective surface of the MEMS mirror 4 is tilted further downward as shown in FIG. 8C, but it is possible for the MEMS mirror 4 to be tilted upward reversely), an axis shift between the output light beam and the collimator lens occurs as shown in FIG. 8C by the dotted line. As the magnitude of axis shift is large, the amount of attenuation increases, resulting in a decrease in intensity of the output light input to fibers of the output port.

FIG. 8D is a schematic to represent input positions of reflected beam from the movable reflector to the collimator lens. FIG. 8D represents input positions of the reflected beam from the movable reflector 70 (MEMS mirror 4) to the collimator lens arranged at the leading end of fibers of the output port.

The reflected beam from the movable reflector 70 (MEMS mirror 4) enters a spot position 21 in a state where there is no axis shift with respect to a collimator lens 20 in the input/output optical system 2 (a case of passing the path shown by the solid line in FIG. 8C). On the other hand, when there is an axis shift with respect to the collimator lens 20, the reflected beam enters a spot position 22, whereby attenuation of the reflected light input to the output fibers occurs. Such an axis shift is not limited to the case in which the angle of the MEMS mirror 4 in the perpendicular direction (vertical direction) with respect to the wavelength dispersion direction is changed in the wavelength dispersion direction (horizontal direction), but is possible by changing the angle with respect to the wavelength dispersion direction.

According to the technology explained in Background Art, attenuation control with respect to reflected light can be carried out by angle control of the reflective surface of each MEMS mirror 4; however, when practical operation is considered, it has been found that deviation of a center wavelength of optical signal irradiated on the MEMS mirror 4 should be taken into consideration.

FIG. 9A is a schematic to represent positions incident to the movable reflector. FIG. 9A represents changes in irradiation positions to the MEMS mirror 4 in a case where the center wavelength of beam incident to the MEMS mirror 4 is changed. Assuming that each beam after separating light into its components by the spectral element 1 represents the center wavelength and that each MEMS mirror 4 is set such that each beam having its center wavelength is irradiated at the center of the MEMS mirror 4, respectively, each beam should be irradiated at the center of each of the MEMS mirrors 4 as shown by 5c in FIG. 9A unless each wavelength contained in wavelength multiplexed optical signals practically deviates from its center wavelength.

However, when the center wavelength of each beam after separating light into its components deviates, each beam is irradiated at the spot shown by 5b or 5d in FIG. 9A, and when it deviates further, each beam is irradiated on the end surface sides of the MEMS mirror 4 (end surface sides of the MEMS mirror 4 with respect to the dispersion direction) such as 5a and 5e in FIG. 9A.

FIG. 9B is a schematic to represent reflected beams from the movable reflector. FIG. 9B represents how the reflected beams on the MEMS mirror 4 spread. What should be paid attention to is that spot diameters of reflected beams 6 (6a and 6e) in a case where the incident beams are irradiated to near the end surface of the MEMS mirror 4 spread at positions away from the MEMS mirror 4 compared to those of reflected beams 6 (6b to 6d) in a case where the reflected beams 6 (6b to 6d) enter near the center of the MEMS mirror 4 because part of incident beams 5 (5a and 5e) is cut off, whereby diffraction occurs.

FIG. 9C is a schematic for explaining power of reflected beams in the case of transmission (there is no Attenuation). With the use of FIG. 9C, the power of the reflected beam input to output fibers in the case of transmission is explained. FIG. 9D is a schematic for explaining the power of the reflected beams in the case of attenuation. With the use of FIG. 9D, the power of the reflected beam input to the output fibers in the case of attenuation is explained. First, FIG. 9C representing a state (refer to the solid line in FIG. 8C) in which an angle of the reflective surface of the MEMS mirror 4 is set at an angle such that attenuation occurs as little as possible is explained.

In FIG. 9C, a curve 8 represents a power characteristic of a reflected beam 6c reflected at the center portion of the MEMS mirror 4 in FIG. 9B, and a curve 9 represents a power characteristic of the reflected beam 6a reflected at an end of the MEMS mirror 4. As described earlier, reflected beams at the ends of the MEMS mirror 4 have a property to spread spatially. Therefore, it is understood that the curve 8 representing the reflected beam at the center portion has a sharp peak, that the power peak of the reflected beam becomes lower as it deviates from the center portion of the MEMS mirror 4, and that a gentle curve is illustrated in the curve 9 as a whole.

The reason why the peaks of different wavelengths are spatially in the same position is that the reflected beams are not only condensed by the condensing optical system but also translated by angle change by the spectral element 1. Further, the width of a region 7 in FIG. 9C represents an opening up to the input/output optical system 2 composed mainly of the collimator lens 20, and the width becomes wider in accordance with the area of the collimator lens 20 shown in FIG. 8D.

When attention is focused on a relation between the region 7 and each curve, both peaks of the curves 8 and 9 are included in the region 7; however, the peak of the curve 8 is higher, and therefore, the area of the hatched portion under the curve 8 within the region 7 is large and the area of the hatched portion under the curve 9 within the region 7 is small. In other words, the area under the curve 8 is larger than that under the curve 9. This indicates that the power of reflected light to be input to the output fibers becomes lower as it deviates from the center wavelength.

Next, FIG. 9D representing a state (refer to the dotted line in FIG. 8C) in which the angle of the reflective surface of the MEMS mirror 4 is set at an angle such that attenuation occurs is explained. The shapes of the curves are approximately the same as those illustrated in FIG. 9C; however, the region 7 is shifted to left (or right) because the axis is shifted as described earlier.

When attention is focused on a relation between the region 7 and each curve 8 or 9, neither peak of the curves 8 and 9 is included in the region 7. The area of the hatched portion within the region 7 under the curve 8 is small, whereas the area of the hatched portion under the curve 9 within the region 7 is large. In other words, the area under the curve 8 is smaller than that under the curve 9. This indicates that the power of the reflected light reflected at the end rather than the center of the MEMS mirror 4 and deviating from the center wavelength becomes higher.

FIG. 10A is a graph to represent a relation between a band and a transmissivity transmissivity in a case of no influence of diffraction, FIG. 10B is a graph to represent a relation between the band and the transmissivity due to the influence of diffraction, and FIG. 10C is a graph to represent a relation between the band and the transmissivity under the influence of diffraction. In the graphs, the horizontal axis represents the band of frequency (wavelength), and the vertical axis represents the transmissivity. Since the magnitude of cut-off of the reflected beams 6 is increased toward the end surface of the MEMS mirror 4, the influence of diffraction tends to become larger. Therefore, provided that there is no diffraction influence, the change of the beam power results only from the cut-off of the reflected beams 6. Thus, the transmissivity-band characteristic is supposed to indicate a trapezoidal shape in the graph as shown in FIG. 10A. However, the transmissivity-band characteristic indicating a reverse trapezoidal shape as shown in FIG. 10B is added due to the diffraction influence.

Accordingly, a practical transmissivity-band characteristic presents, as shown in FIG. 10C, approximately an M shape indicating that the transmissivity becomes large at the band ends (at both ends) of a certain wavelength. Although the earlier explanation has been described about deviation of the center wavelength, a case in which not only a signal light of the center wavelength but also an amplified spontaneous emission (ASE) light containing wavelength components that deviate from the center wavelength are irradiated on the MEMS mirror 4 is taken into consideration. In such a case of the transmissivity-band characteristic, the characteristic (the transmissivity is small) shows that side lobe portions 12 representing bands where ASE (white noise) generated when an optical amplifier is connected to the optical switch 10 is present have a transmissivity higher than that of a flat portion 11 representing a band where the reflected beams 6 of the signal light exist. This gives rise to a problem that a gain of the ASE becomes larger than that of the signal light when, for example, the optical switch 10 is multistage-connected. Although such a transmissivity-band characteristic is generated even when the angle of the MEMS mirror 4 is changed in any direction, that is, in the horizontal direction or in the vertical direction, there is a difference in degree, and the influence is smaller when the angle of the MEMS mirror 4 is changed in the arrangement direction of the input/output ports (the vertical direction shown in FIG. 8A to 8C).

Next, a difference between the way of beam spreading by diffraction at the ends of the MEMS mirror 4 with respect to the direction perpendicular to the dispersion direction by the spectral element 1 and the way of beam spreading by the diffraction at the ends of the MEMS mirror 4 with respect to the dispersion direction by the spectral element 1 is explained. The diffraction due to the ends of the MEMS mirror 4 with respect to the direction perpendicular to the dispersion direction by the spectral element 1 occurs by a decrease in a maximum vertical diameter of the beam irradiated at the ends of the MEMS mirror 4.

Therefore, the horizontal diameter of the beam having a wavelength whose edge enters slightly the end of the MEMS mirror 4 is decreased; however, its maximum vertical diameter portion is still irradiated on the MEMS mirror 4, and therefore, diffraction is hard to occur. Further, when the end of the MEMS mirror 4 cuts the portion of the maximum vertical diameter, diffraction occurs; however, at this time, over half of the whole beam has already been cut off. Therefore, the power of the light to spread by diffraction becomes smaller, resulting in a curve like the curve 9 shown in FIG. 9C and 9D whose peak is further pushed down.

On the other hand, the diffraction due to the ends of the MEMS mirror 4 with respect to the dispersion direction by the spectral element 1 occurs by a decrease in the maximum horizontal diameter of the beam irradiated to the ends of the MEMS mirror 4. Therefore, as for the wavelength whose edge enters slightly the ends of the MEMS mirror 4, the beam also begins to decrease in the horizontal diameter, and diffraction thus occurs, resulting in spreading of the reflected beam. However, since most of the beam is still irradiated to the MEMS mirror 4, the power of the reflected beam to be diffracted is large.

Accordingly, when the attenuation of the reflected light to be led to the output fibers is carried out by rotating the MEMS mirror 4 in the direction perpendicular to the dispersion direction by the spectral element 1, the peaks of the side lobe portions 12 shown in FIG. 10C become small, and conversely, when the attenuation of the reflected light to be led to the output fibers is carried out by rotating the MEMS mirror 4 in the dispersion direction by the spectral element 1, the peaks of the side lobe portions 12 shown in FIG. 10C become large.

Further, to make the band wide, when the incident beam 5 is made in an oval shape such that the vertical direction is a long axis and the horizontal direction is a short axis on the MEMS mirror 4, most of the beam irradiated to the MEMS mirror 4 is cut off by the time when the diameter in the vertical direction becomes short, and the influence of the diffraction becomes smaller, resulting in that a difference in degree of the diffraction is generated further notably compared with that of the diffraction in the horizontal direction.

FIG. 11 is a graph to represent a simulation example of the band characteristic when an angle is changed to the horizontal direction (wavelength dispersion direction). In FIG. 11, the horizontal axis represents a normalized band, and the vertical axis represents an output transmissivity (decibel (dB)) including insertion loss with respect to input. The variable optical attenuation (VOA) in FIG. 11 is light transmissivity when the angle of the MEMS mirror 4 is variably changed.

When there is no attenuation (VOA=0 dB), the influence of diffraction is not seen, and the band characteristic shows a flat band characteristic in a trapezoidal shape in the graph. As the attenuation becomes larger, the influence of the diffraction is generated. In addition, as shown in FIG. 10C, a characteristic that an output light intensity at the ends of the band rises approximately in an M shape to generate side lobes is seen in the graph (the side lobe portion 12 is referred to as Ear (ear)). For example, when VOA is equal to 10 decibels (VOA=10 dB), the Ear rises by about three decibels with respect to the flat portion.

Thus, when the optical switch that has the band characteristic with the Ear rising higher than the flat portion at the center is used for an optical system, a problem that the protrusions seen in the graph are also amplified at the time of light amplification by an optical amplifier, resulting in deterioration of signal (S)/noise (N) (ratio of signal to noise). This problem becomes particularly notable at the time of multistage connection. Therefore, a system structure having high flexibility could not be conventionally built because the number of multistage connection was limited.

SUMMARY OF THE INVENTION

It is an object of the present invention to at least solve the problems in the conventional technology.

A mirror according to an aspect of the present invention has a reflective surface of a variable angle. The mirror includes a center portion and an end portion that is provided at a predetermined end of the mirror. The reflectance of the end portion is lower than that of the center portion.

A mirror according to another aspect of the present invention has a reflective surface of a variable angle and a notch near a predetermined end of the mirror.

A mirror unit according to still another aspect of the present invention includes a mirror with a reflective surface of a variable angle. The reflective surface includes a center portion and an end portion that is provided at a predetermined end of the mirror. The reflectance of the end portion is lower than that of the center portion.

A mirror unit according to still another aspect of the present invention includes a mirror with a reflective surface of a variable angle. The reflective surface includes a center portion and an end portion that is provided at a predetermined end of the mirror and has a lower reflectance than that of the center portion. A beam of light irradiating the reflective surface and moving from the center portion to the end portion begins to irradiate the end portion before the beam begins to deviate from the reflective surface.

A mirror unit according to still another aspect of the present invention includes a mirror with a reflective surface of a variable angle, and a reflection attenuation film that is provided in front of the reflective surface and attenuates a beam of light irradiating a predetermined end of the reflective surface.

An optical switch according to still another aspect of the present invention includes a spectral unit that disperses a beam of light; a mirror that reflects the beam by a reflective surface of variable angle; and a plurality of ports that outputs the beam reflected by the mirror. The reflective surface includes a center portion and an end portion that is provided at a predetermined end of the mirror and has a lower reflectance than that of the center portion.

An optical switch according to still another aspect of the present invention includes a spectral unit that disperses a beam of light; a mirror that reflects the beam by a reflective surface of variable angle; and a plurality of ports that outputs the beam reflected by the mirror. The reflective surface includes a notch near a predetermined end of the mirror.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 11 is a graph to represent a simulation example of the band characteristic resulting from angle change to the horizontal direction (wavelength dispersion direction).

DETAILED DESCRIPTION

Exemplary embodiments of a mirror, a mirror unit, and an optical switch according to the present invention are explained in detail with reference to the accompanying drawings.

In the present embodiments, deterioration of an attenuation characteristic due to diffraction is controlled by devising a structure of the mirror.

According to a first embodiment, for example, with respect to the mirror having a reflecting surface whose angle is variably changed, a low reflectance portion is formed for at least part of ends on a predetermined side such that a reflectance is made lower with respect to that at a center portion, a reflectance is allowed to become lower with the distance from the center portion toward the ends on the predetermined side, an average reflectance of an irradiated portion is allowed to become lower when a beam is moved from the center portion toward the ends on the predetermined side to be irradiated with respect to an average reflectance of an irradiated portion when the beam is irradiated to the center portion, and the beam is allowed to enter a portion having a reflectance lower than that of the center portion before the beam begins to deviate from the reflective surface when the beam irradiated to the center portion is allowed to move toward the ends on the predetermined side.

Figure 8B:
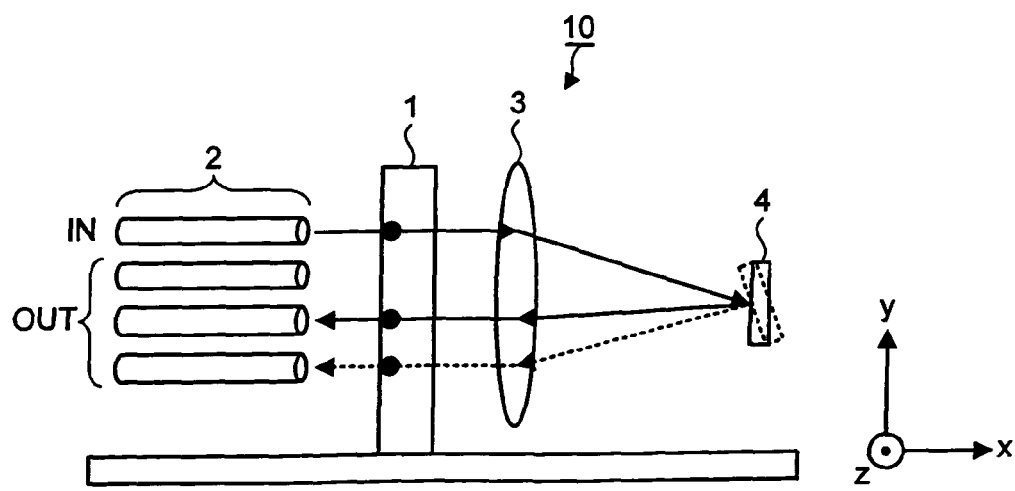
FIG. 8B is a side view to represent the optical switch.
Figure 8C:
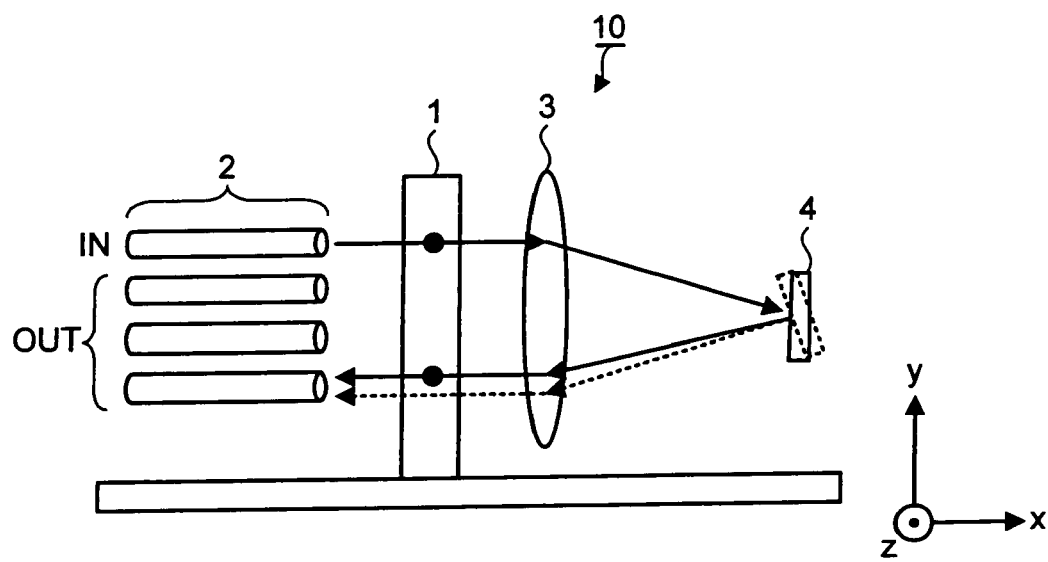
FIG. 8C is a side view to explain a principle of output light attenuation.
Figure 8D:
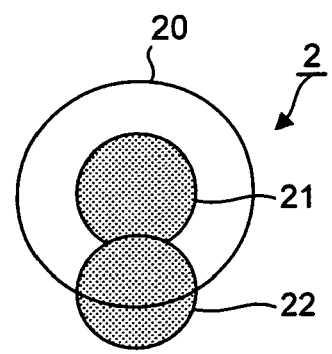
FIG. 8D is a schematic to represent input positions of a reflected beam from a movable reflector to a collimator lens.
Figure 9A:
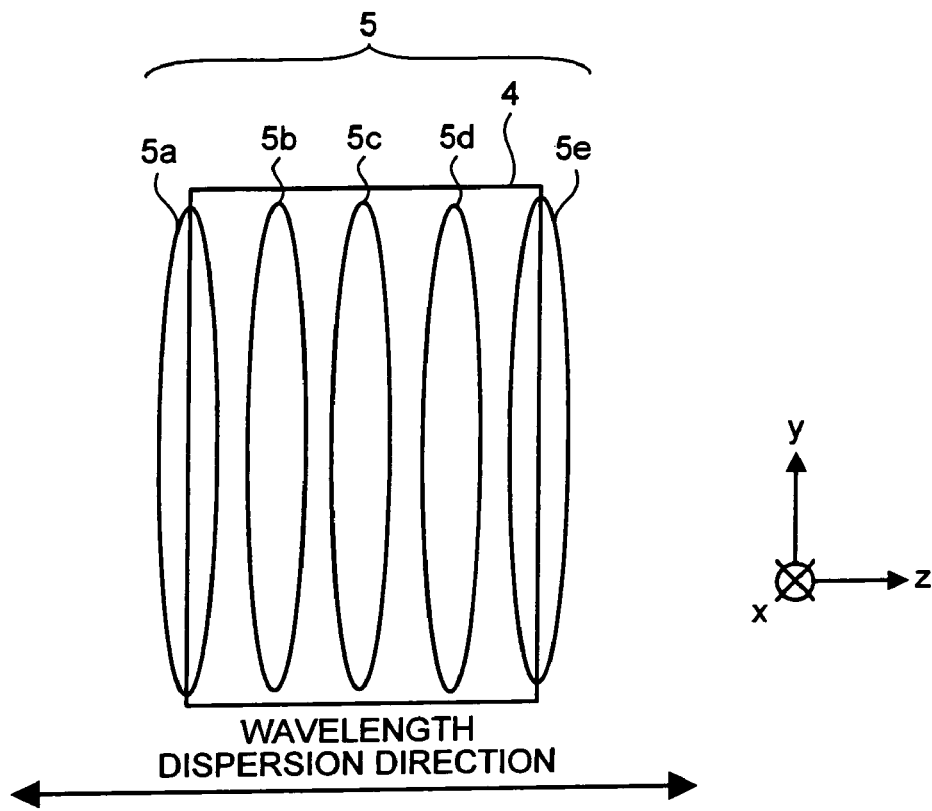
FIG. 9A is a schematic to represent positions incident to the movable reflector.
Figure 9B:
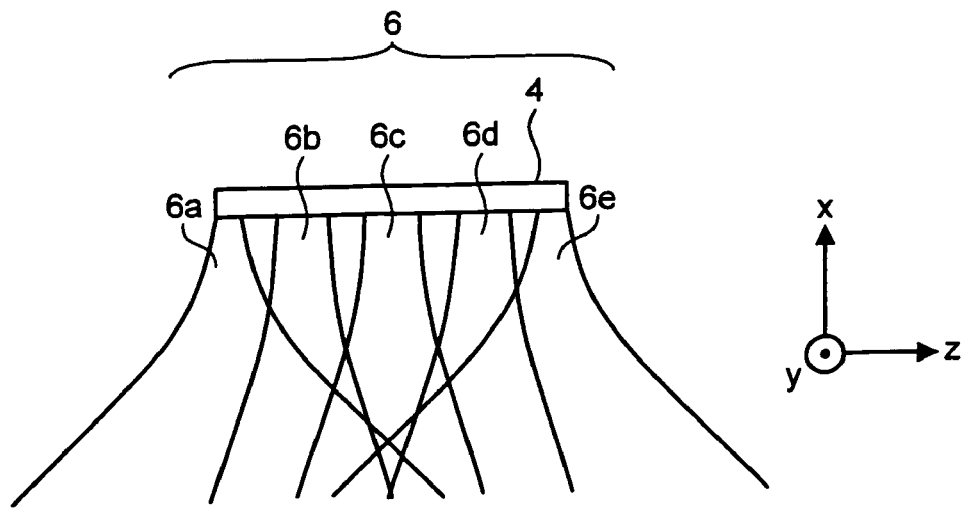
FIG. 9B is a schematic to represent reflected beams from the movable reflector.
Figure 9C:
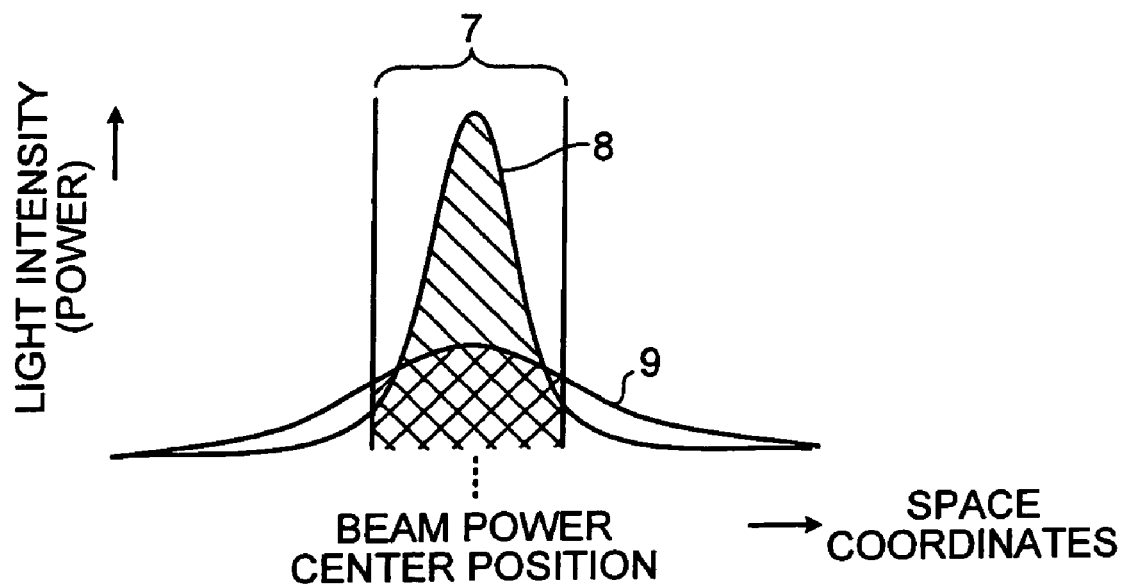
FIG. 9C is a schematic for explaining power of reflected beams at the time of transmission.
Figure 9D:
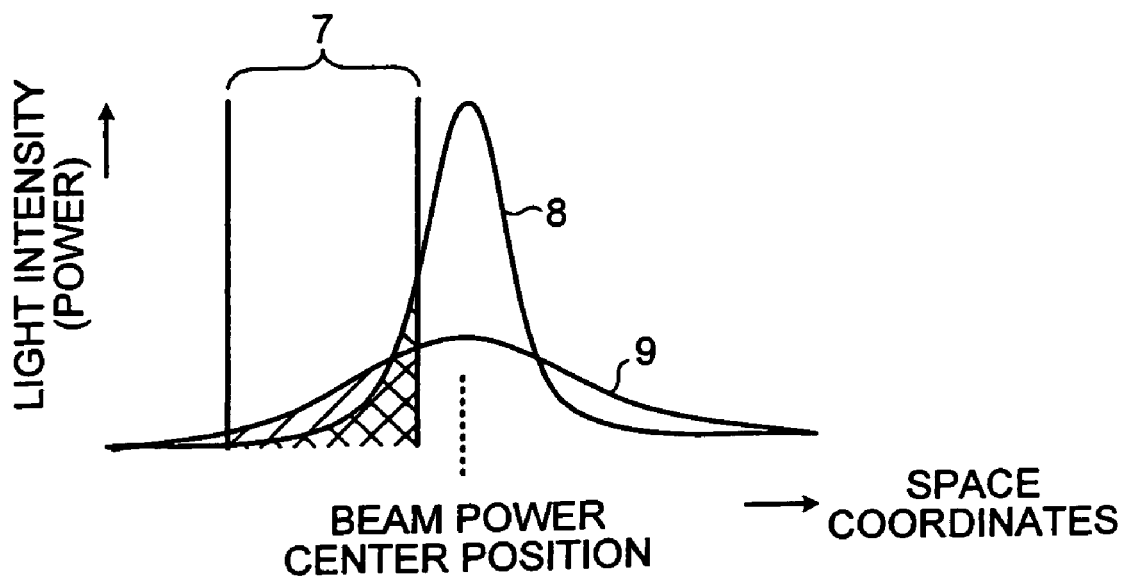
FIG. 9D is a schematic for explaining the power of the reflected beams at the time of attenuation.

According to a second embodiment, further, notches or holes are provided to the side surfaces at the ends on the predetermined side. The side surfaces at the ends on the predetermined side are, for example, in the arrangement direction in which light of each wavelength dispersed by the spectral element 1 is irradiated on the mirror, and also the end surfaces in the Z axis direction in FIG. 8B. According to this structure, the beam power can be made to be in a state of a curve 9a by making small the curve 9 itself of the reflected beams 6 that have been affected by diffraction at the time of the light attenuation described above (refer to FIG. 9D). Therefore, the peak power of the reflected light to be diffracted at the ends is lowered as a whole, thereby reducing the influence of the diffraction.

Figure 1:
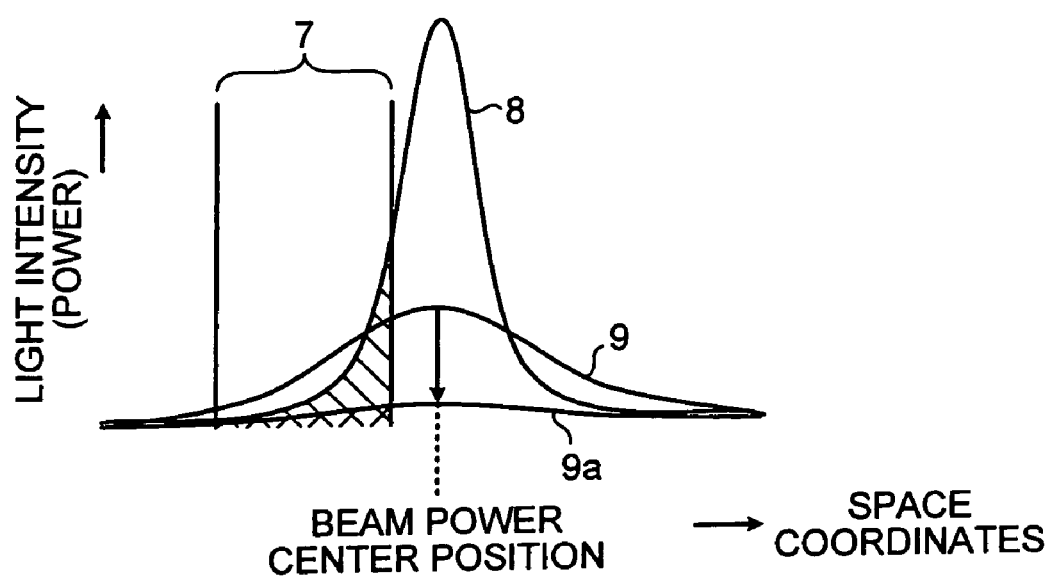
FIG. 1 is a schematic for explaining a principle of the present invention.

FIG. 1 is a schematic for explaining a principle of the present invention. The horizontal axis represents space coordinates, and the vertical axis represents light intensity (power) in FIG. 1. FIG. 1 represents beam power of light incident to the MEMS mirror 4 of the movable reflector 70. Among the numerals and symbols in the drawings, the same components explained below as those described above are designated by the same numerals and symbols.

Figure 10A:
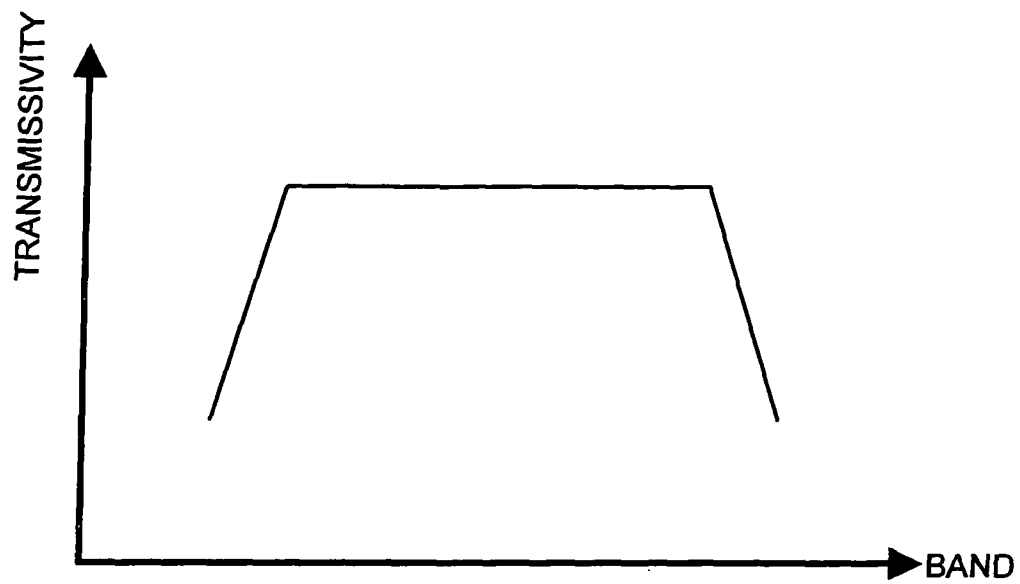
FIG. 10A is a graph to represent a relation between a band and a transmissivity in a case of not influence of diffraction.
Figure 10B:
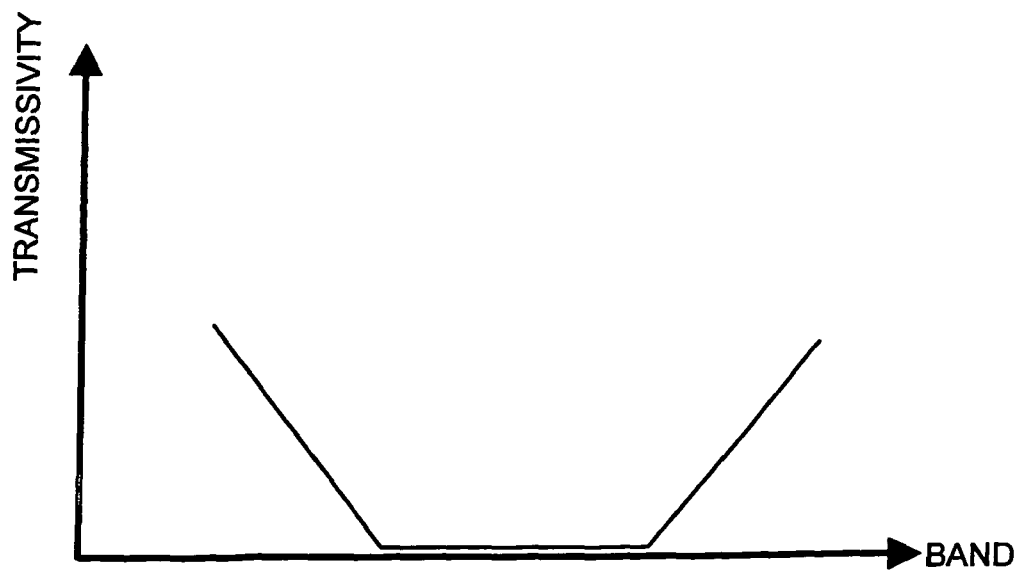
FIG. 10B is a graph to represent a relation between the band and the transmissivity due to the influence of diffraction.
Figure 10C:
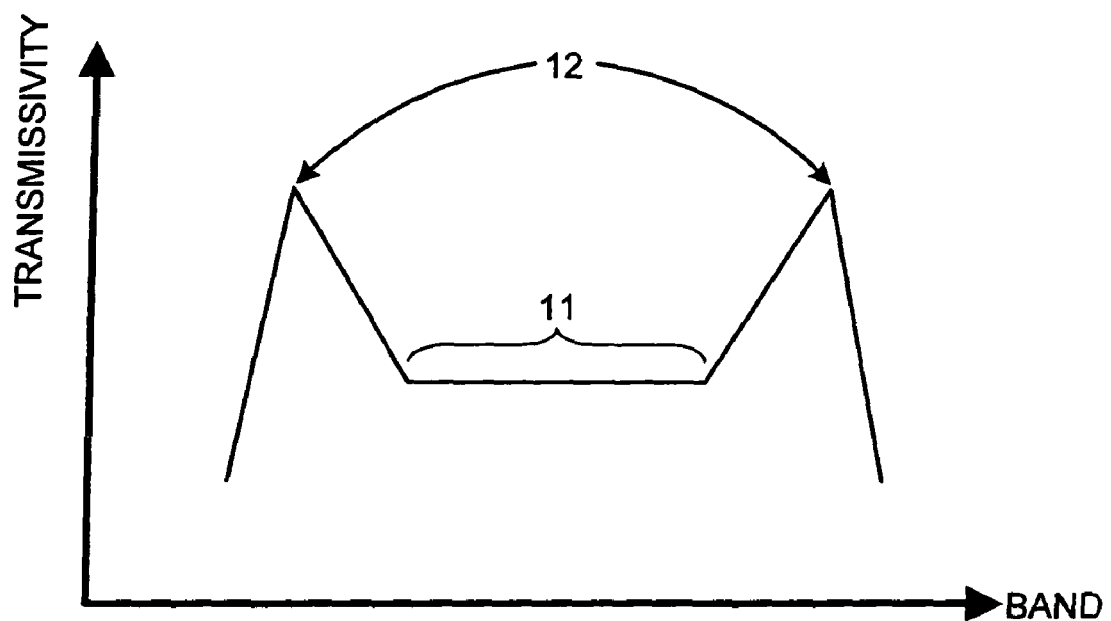
FIG. 10C is a graph to represent a relation between the band and the transmissivity under the influence of diffraction.

As is clear from FIG. 1, the beam power of the wavelength to which diffraction occurs at the ends is lowered, and therefore the beam power is also lowered at the foot as a whole as shown by 9a by devising the ends of the mirror. Thus, among the hatched portions of the region 7, the situation in which the area of the portion under the curve 9 becomes larger than that of the portion under the curve 8 is controlled, resulting in lowering the peaks of the side lobe portions (Ears) 12 shown in FIG. 10C.

Figure 2A:
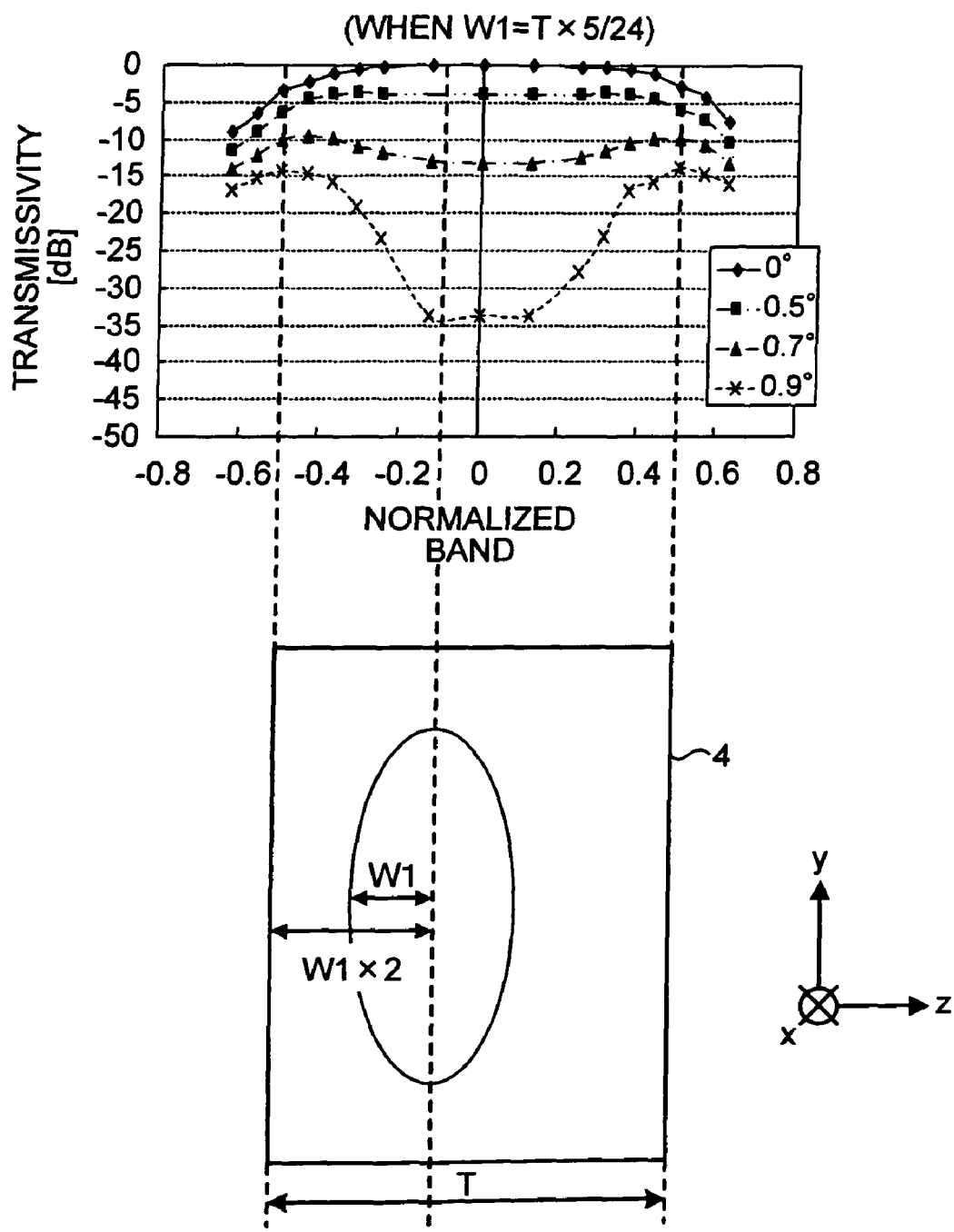
FIG. 2A is a graph of simulation results representing a relation between a spot diameter and a band characteristic influenced by diffraction (part 1)
Figure 2B:
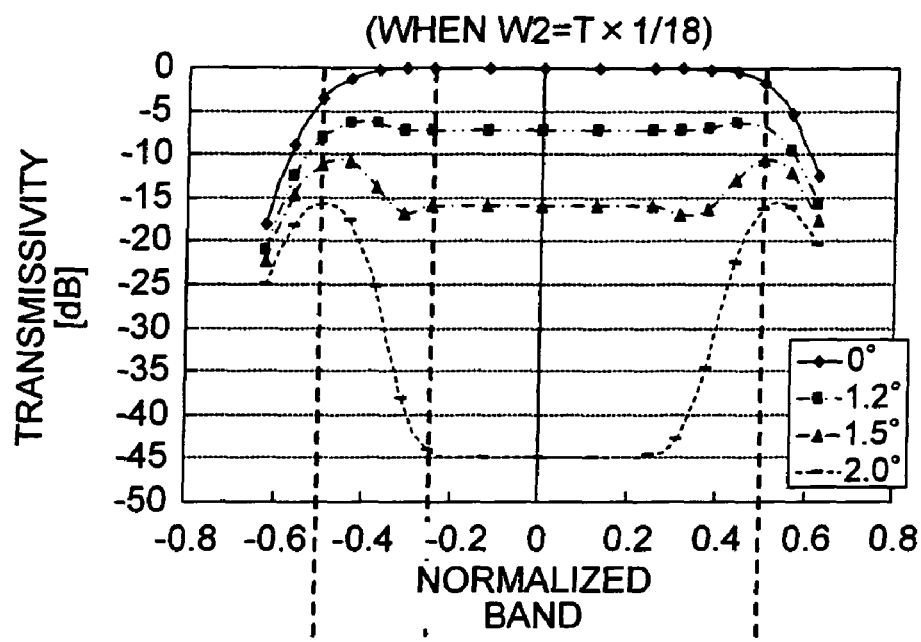
FIG. 2B is a graph of simulation results representing another relation between the spot diameter and the band characteristic influenced by diffraction (part 2)
Figure 2B:
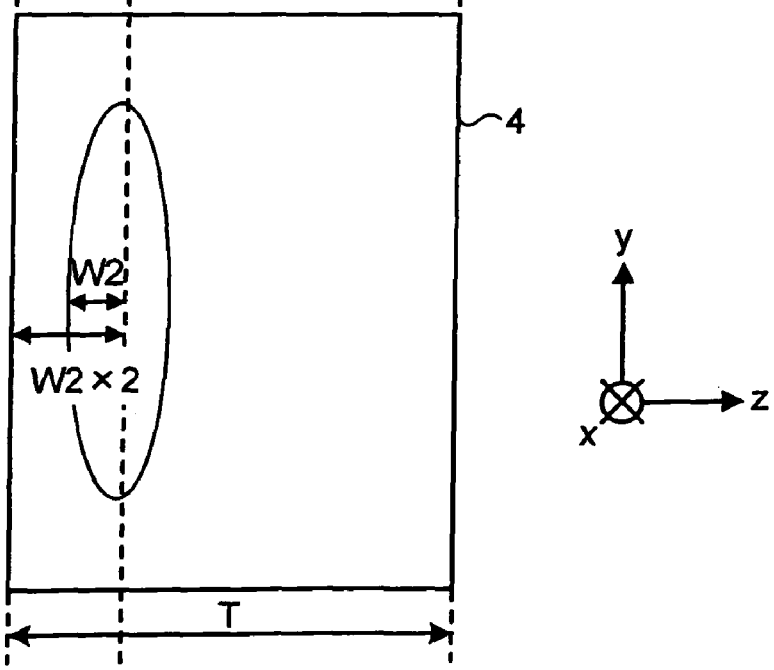
Figure 2C:
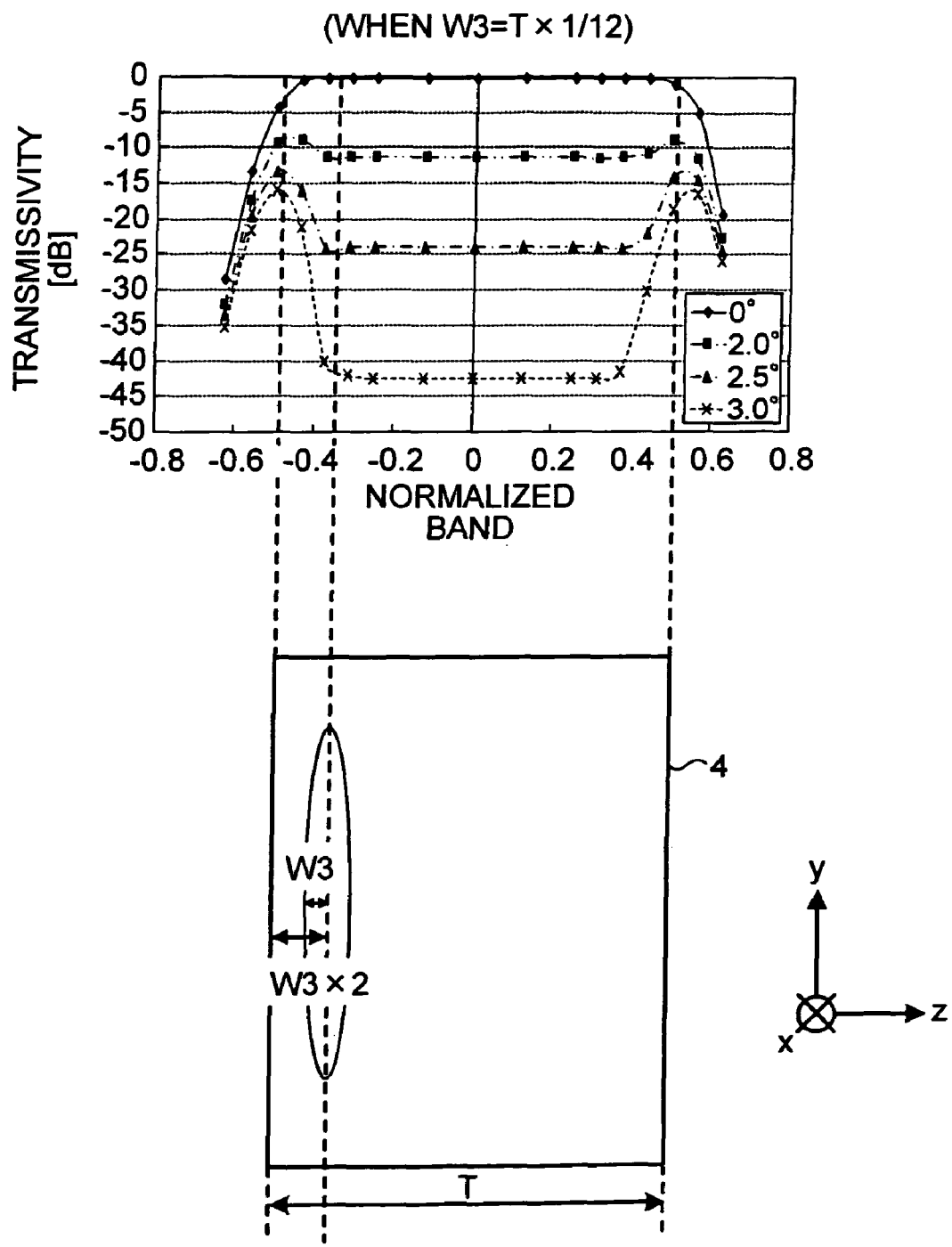
FIG. 2C is a graph of simulation results representing still another relation between the spot diameter and the band characteristic influenced by diffraction (part 3)

FIG. 2A to 2C are graphs of simulation results representing the relation between a spot diameter and a band characteristic influenced by diffraction, respectively. Ws (W1, W2, and W3) in the illustrations are beam spot radii in the horizontal direction on the MEMS mirror 4, and T represents a horizontal width of the MEMS mirror 4, respectively. FIG. 2A to 2C depict a plurality of characteristics for each angle (0 degree to 0.9 degree) representing angle change of the MEMS mirror 4.

Each specific transmissivity can be obtained depending on each angle of this MEMS mirror 4. It is found that when W changes like W1 to W3, a band position at which an influence of diffraction begins to appear changes, and the position is the one at which the center of the beam spot becomes 2W from the end of the MEMS mirror 4. This is because the influence of diffraction is generally generated at the position that is twofold of the spot radius W (W1 to W3) in a case of Gaussian beam.

Figure 3:
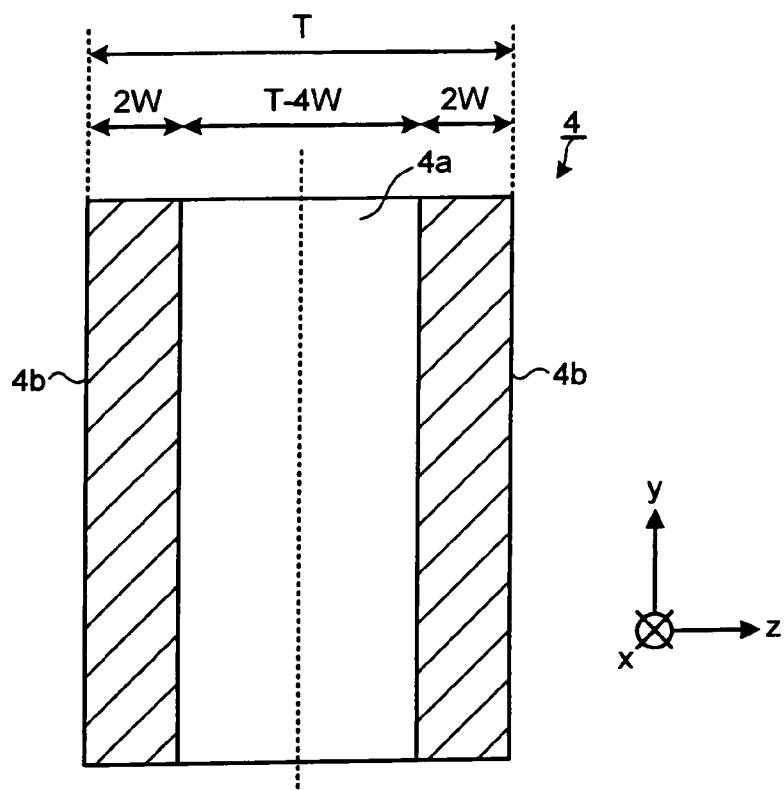
FIG. 3 is a front view of a MEMS mirror according to a first embodiment of the present invention.

FIG. 3 is a front view of the MEMS mirror according to the first embodiment of the present invention. FIG. 3 is a specific example of the first embodiment described above. From the simulation results explained with the use of FIG. 2A to 2C described above, the structure is constructed to have a reflectance distribution that a reflectance is made constant near the center (the area of T-4W in FIG. 3) represented by $-((T/2)-2W)$ to $((T/2)-2W)$, and a reflectance is decreased as the beam moves closer to each of ends 4b in the predetermined ranges (the two areas of 2W in FIG. 3) near the ends 4b represented by $-T/2$ to $-((T/2)-2W)$ and $T/2-2W$ to $-(T/2)$ in the reflectance distribution to counteract the influence of diffraction. The T/2 is the center of the mirror, and + and − represent ranges of one side and the other side seen from the center, respectively.

In other words, the reflectance becomes lower as the beam moves closer to the ends. It is desirable that the ends are ends with respect to the dispersion direction by the spectral element 1. This is because the influence on the side lobe portions (Ears) 12 due to diffraction is more notable when the reflective surface of the MEMS mirror 4 is allowed to rotate in the horizontal direction. However, in either embodiment, the ends to be devised may be the ends in the vertical direction, or the ends opposite to each other with sandwiching the rotation axis of the MEMS mirror 4.

Figure 4:
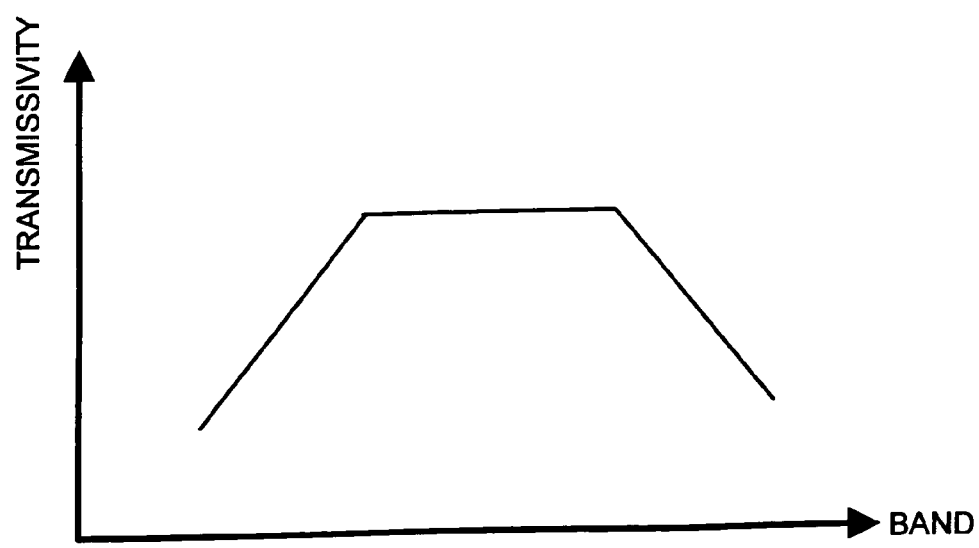
FIG. 4 is a graph representing a relation between transmissivity and band characteristic of the MEMS mirror shown in FIG. 3.

FIG. 4 is a graph representing a relation between transmissivity and band characteristic of the MEMS mirror 4 shown in FIG. 3. In the change of the transmissivity-band characteristic according to the reflectance distribution shown in FIG. 4, there is no change near a center 4a, and the transmissivity changes according to the reflection distribution near the ends 4b to form a trapezoidal shape in the graph. Therefore, by adjusting the reflectance distribution near the ends 4b, the structure is made to have a reflectance distribution to show the transmissivity-band characteristic formed by just turning upside down the characteristic change resulting from the influence due to diffraction. Owing to this, the influence of diffraction is eliminated.

Figure 5:
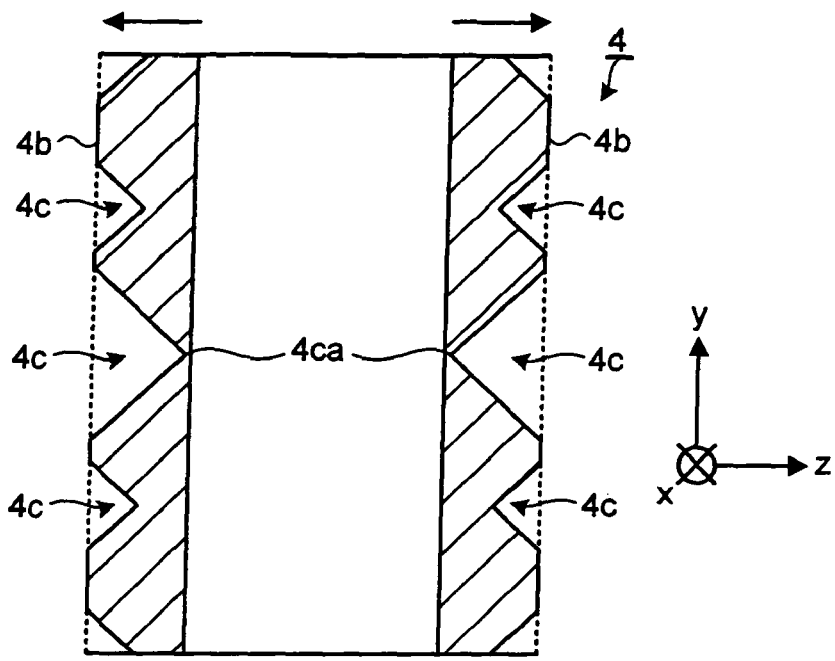
FIG. 5 is a front view of the MEMS mirror according to a second embodiment of the present invention.

FIG. 5 is a front view of the MEMS mirror according to the second embodiment of the present invention. FIG. 5 represents a specific example of the second embodiment described above. The whole surface of the MEMS mirror 4 has the same reflectance (the reflectance near the center 4a and that at the ends 4b are the same). A plurality of notches 4c is provided on the ends 4b along the vertical direction. The beam diameter of a light having a wavelength (a light whose wavelength reflects near the ends of the MEMS mirror 4) enters tips 4ca of the notches 4c, which causes reduction in an area of the reflective surface while retaining its maximum diameter in the horizontal direction to some extent, and therefore, the power to be led to the output fibers is reduced, resulting in lowering of the peaks in the side lobe portions 12 shown in FIG. 10C.

Preferably, the tips 4ca of the large notches shown by 4c in FIG. 5 are allowed to face in the center of the MEMS mirror 4, whereby the center portion having relatively large power compared to its peripheral portion can be cut off effectively and peaks of the power of light (the peaks of the side lobe portions 12 shown in FIG. 10C) that would spread due to diffraction at the ends can be effectively suppressed.

Figure 6:
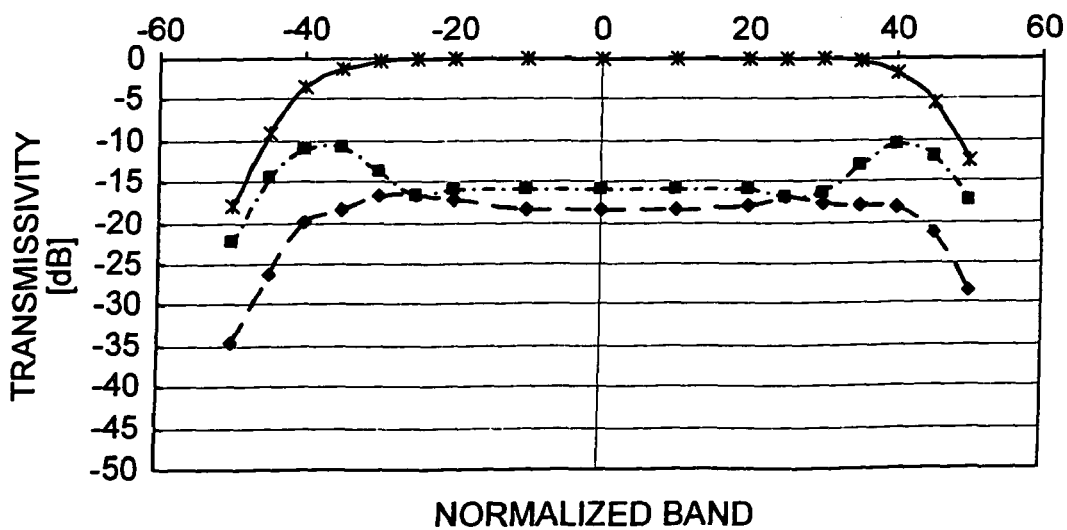
FIG. 6 is a graph of simulation results of the structure shown in FIG. 5.

FIG. 6 is a graph of simulation results of the structure shown in FIG. 5. When there is not attenuation of the output light intensity by angle change of the MEMS mirror 4 (0 degree in a conventional example: no attenuation), no influence of diffraction appears showing a trapezoidal. characteristic. However, as the angle of the movable reflector is changed and the output light intensity is attenuated, the influence due to diffraction appears to form Ears in an approximate M shape, and therefore, the transmissivity becomes large at the band ends (1.5 degrees in the conventional example). According to the structure shown in FIG. 5, this influence due to diffraction can be eliminated, the Ears (portions of ears) are suppressed, and approximately the same band characteristic as that before the attenuation can be obtained (1.5 degrees).

As for a modification example of the structure shown in FIG. 5, holes (through-holes) or recesses having the same area as that of the notches 4c may be provided near the ends 4b without providing the notches 4c. Besides this, non-reflective films that have the same area as that of the notches 4c may be formed near the ends 4b, respectively. Further, to reduce the reflection amount near the ends 4b, it is conceivable that the face may be formed rough so as to have the same area as that of the notches 4c. In addition, the areas near the ends 4b of the MEMS mirror 4 may be bent in a direction (outwardly) different from a direction toward the vicinity of the center 4a (formation of recess). In this case, it is preferred that the angle is made gentle such that the light reflected by the bent face is not affected by diffraction.

Another structural example that provides distribution to the reflectance of the MEMS mirror 4 can be constructed by providing reflection attenuation films whose light reflectance has a predetermined distribution before the movable reflector 70 with the MEMS mirrors 4 each having a uniform reflectance on its entire surface. In other words, a mirror unit (movable reflector) is constructed such that, when a beam is moved parallel to the direction of the ends on the predetermined side from the center portion and irradiated, an average reflectance at the irradiated portion is decreased with respect to an average reflectance at the irradiated portion when the beam is irradiated to the center portion.

Figure 7A:
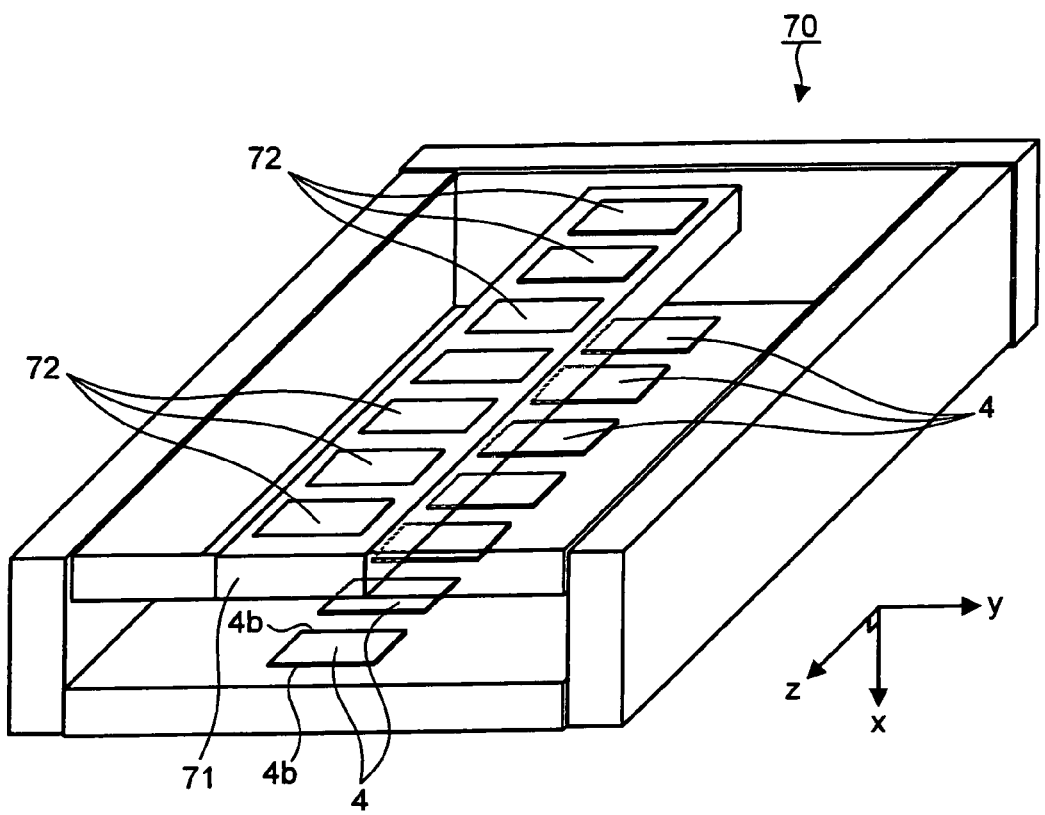
FIG. 7A is a perspective view to represent a micromirror package constructed with reflection attenuation films.
Figure 7B:
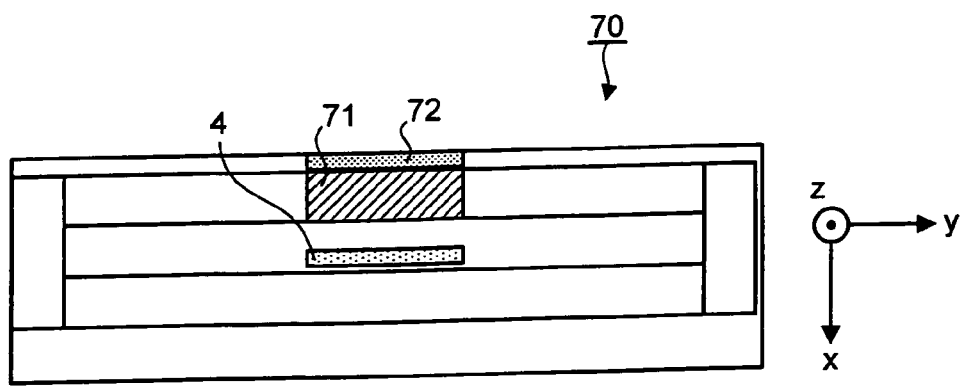
FIG. 7B is a side cross sectional view to represent the micromirror package.

FIG. 7A is a perspective view to represent a micromirror package constructed with the reflection attenuation films. FIG. 7B is a side cross sectional view to represent the micromirror package. The micromirror package serving as the movable reflector 70 is provided with a plurality of MEMS mirrors 4 along the wavelength dispersion direction of the spectral element 1 (refer to FIG. 8A). The MEMS mirrors 4 are micromirrors fabricated with the use of a silicon (Si) micromachine technology. The angle (tilt) of each of the MEMS mirrors 4 can be controlled by an electrostatic force generated by applying a voltage between the mirrors and electrodes arranged on the back surfaces of the mirrors, respectively.

On entering/reflecting portions (windows) 71 for light of the movable reflector 70 (the micromirror package) housing the MEMS mirrors 4, a plurality of reflection attenuation films 72 are arranged independently corresponding to the plurality of MEMS mirrors, respectively. Each MEMS mirror 4 has a uniform reflectance all over its surface. The distribution of the reflectance that each of the reflection attenuation films 72 has may be formed in the predetermined range of the ends 4b of each MEMS mirror 4 such that the reflectance is decreased as a beam comes closer to the ends 4b as explained using FIG. 3.

Figure 8A:
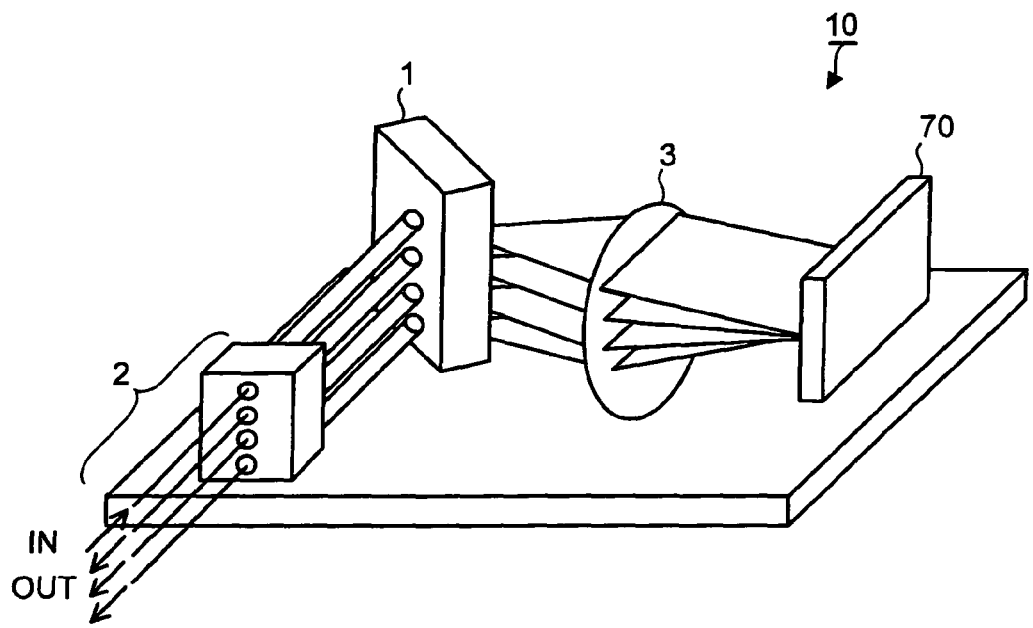
FIG. 8A is a perspective view to represent a structure of an optical switch.

The MEMS mirror 4 shown in the present embodiment is not only usable for a mirror array in the optical switch shown in FIG. 8A but also preferably applied to a mirror array unit and the like in an optical switch having an attenuation function by adjusting vertically or horizontally the angle of the reflective surface of the MEMS mirror 4. On applying the MEMS mirror 4, only replacing a conventional mirror with the MEMS mirror 4 is sufficient. When a switch provided with this light variable attenuation function is applied to an optical system, light amplification by an optical amplifier can be carried out without deteriorating a ratio of signal to noise (S/N). Therefore, this enables multistage connection and also construction of an optical system having high flexibility. In particular, the band characteristic can be made flat, thereby making it possible to uniform optical signal levels among channels that are allocated to each band and to improve signal quality in all bands of optical signals that have been multiplexed.

According to the present invention, an effect that deterioration of the attenuation characteristic due to diffraction can be controlled is offered.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A mirror having a reflective surface of a variable angle, comprising:
   a center portion;
   an end portion that is provided at a predetermined end of the mirror, wherein a reflectance of the end portion is lower than a reflectance of the center portion; and
   a spectral unit that disperses a beam of light, wherein the predetermined end is an end in the direction of the dispersion.

2. A mirror, comprising:
   a reflective surface of a variable angle having at least one notch on an end part of the reflective surface along a length of an edge in a same plane as the mirror, wherein the notch reduces an area of the reflective surface.

3. The mirror according to claim 2, wherein the notch has a tip that faces toward a center of the mirror.

4. The mirror according to claim 2, further comprising a spectral unit that disperses a beam of light, wherein the predetermined end is an end in the direction of the dispersion.

5. A mirror unit comprising:
   a mirror with a reflective surface of a variable angle; and
   a reflection attenuation film that is provided in front of the reflective surface and attenuates a beam of light irradiating a predetermined end of the reflective surface.

6. An optical switch comprising:
   a spectral unit that disperses a beam of light;
   a mirror that reflects the beam by a reflective surface of variable angle; and
   a plurality of ports that outputs the beam reflected by the mirror, wherein the reflective surface includes:
   a center portion; and
   an end portion that is provided at a predetermined end of the mirror and has a lower reflectance than a reflectance of the center portion.

7. An optical switch comprising:
   a spectral unit that chromatically disperses a beam of light;
   a mirror that reflects the beam by a reflective surface of variable angle; and
   a plurality of ports, at least one of which outputs the beam reflected by the mirror, wherein the reflective surface includes a notch near a predetermined end of the reflective surface.

8. The optical switch according to claim 6, wherein a transmissivity of reflected light entering the output ports is controlled by an angle of the mirror.

9. The optical switch according to claim 7, wherein a transmissivity of reflected light entering the output ports is controlled by an angle of the mirror.

10. A mirror comprising:
    a reflective surface of a variable angle;
    a center portion;
    an end portion provided at a predetermined end of the mirror;
    at least one hole provided on the predetermined end of the mirror; and
    a spectral unit dispersing a beam of light,
    wherein a reflectance of the end portion is lower than a reflectance of the center portion and the predetermined end is in the direction of the light dispersion.

* * * * *